United States Patent [19]
Ueda et al.

[11] Patent Number: 6,080,956
[45] Date of Patent: *Jun. 27, 2000

[54] FIBER OPTIC LIGHT BEAM HEATING APPARATUS WITH ADJUSTABLE LENS POSITION

[75] Inventors: Masayoshi Ueda, Nishinomiya; Tamotu Ikeda, Toyonaka; Moriaki Kawasaki, Suita; Nobuyuki Haji, Osaka, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/071,962

[22] Filed: May 5, 1998

[30] Foreign Application Priority Data

May 19, 1997 [JP] Japan ..................................... 9-128222

[51] Int. Cl.$^7$ ............................. B23K 1/005; B23K 26/20
[52] U.S. Cl. ................................. 219/121.63; 219/121.75
[58] Field of Search ........................... 219/121.6, 121.63, 219/121.65, 121.75; 385/33; 392/419

[56] References Cited

U.S. PATENT DOCUMENTS

| | | | |
|---|---|---|---|
| 4,899,924 | 2/1990 | Kawaguchi | 219/121.63 |
| 4,997,250 | 3/1991 | Ortiz, Jr. | 219/121.75 X |
| 5,122,635 | 6/1992 | Knodler et al. | 219/121.63 |
| 5,430,816 | 7/1995 | Furuya et al. | 385/31 |
| 5,525,777 | 6/1996 | Kukuljan | 219/121.65 X |
| 5,624,587 | 4/1997 | Otsuki et al. | 219/121.75 X |
| 5,998,758 | 12/1999 | Moser et al. | 219/121.63 |

FOREIGN PATENT DOCUMENTS

| | | | |
|---|---|---|---|
| 58-38689 | 3/1983 | Japan | 219/121.75 |
| 4-361887 | 12/1992 | Japan . | |
| 7-303978 | 11/1995 | Japan . | |

*Primary Examiner*—Gregory Mills
*Attorney, Agent, or Firm*—Wenderoth, Lind & Ponack, L.L.P.

[57] ABSTRACT

A light beam heating apparatus is provided comprising: a light source; an optical fiber for transmitting light from the light source; a lens mechanism which is provided at an output end of the optical fiber; and a first adjustment device for adjusting a distance between the lens mechanism and the output end of the optical fiber.

1 Claim, 5 Drawing Sheets

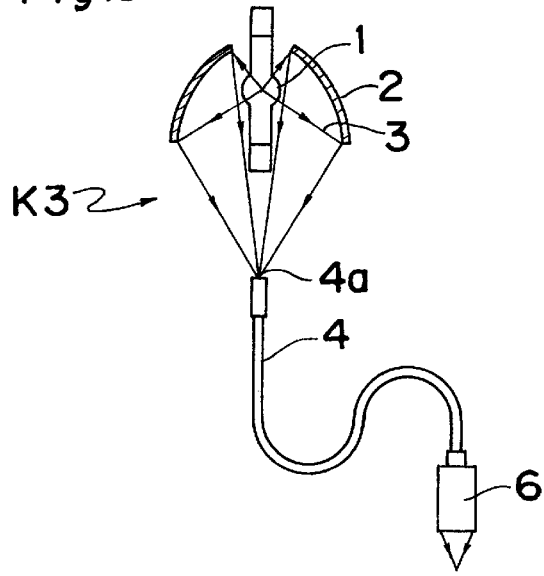
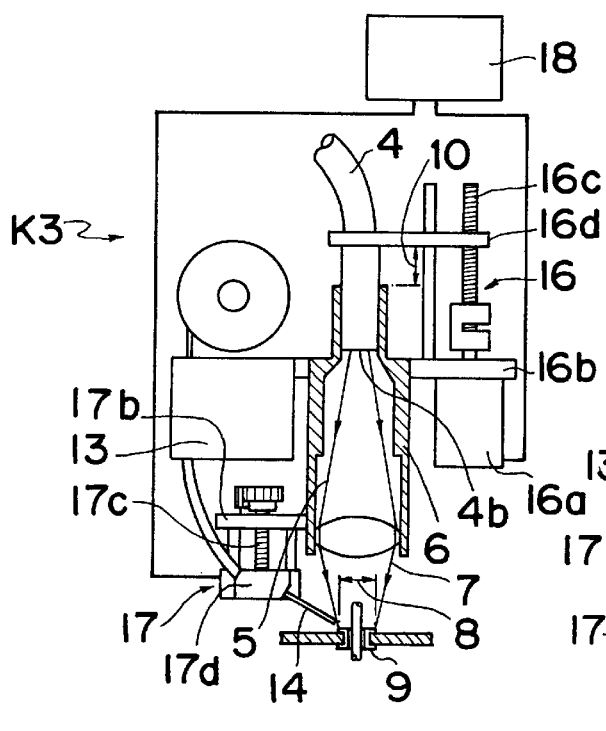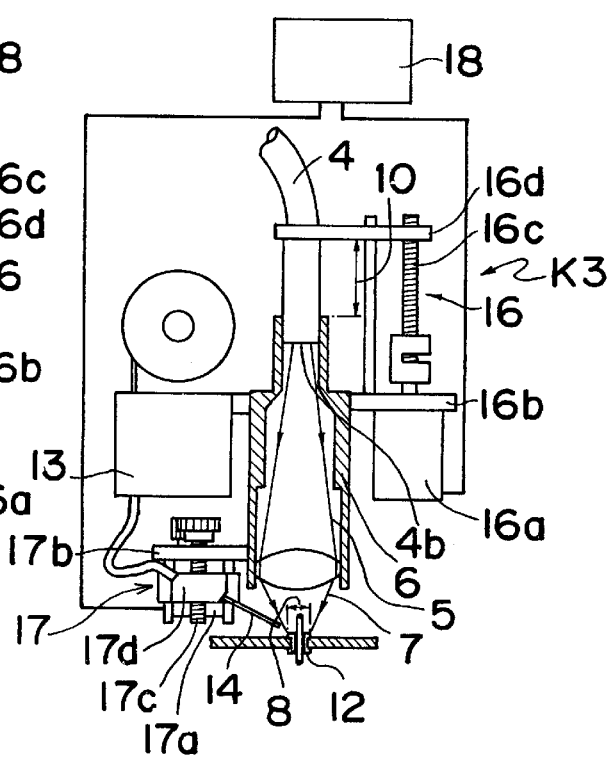

6,080,956

FIBER OPTIC LIGHT BEAM HEATING APPARATUS WITH ADJUSTABLE LENS POSITION

BACKGROUND OF THE INVENTION

The present invention generally relates to light beam heating apparatuses which enable local heating by converging light from a light source such as a light emitting lamp, a laser diode or the like. More particularly, it relates to a light beam heating apparatus suitable for heating in soldering, removal of a coating of a small-diameter polyurethane wire, heating of synthetic resin, etc.

Light beam heating apparatuses in which light from a light source such as a light emitting lamp, a laser diode or the like is incident upon one end of an optical fiber, and light emitted from the other end of the optical fiber is reconverged by using a lens mechanism so as to heat an article disposed in the vicinity of a point of convergence are widely used in recent years as non-contact local heating apparatuses for soldering electronic components, heating or fusing synthetic resin, etc.

Hereinafter, a construction of the known light beam heating apparatuses and heating of the article by the known light beam heating apparatuses are described with reference to FIGS. 9 and 10. FIGS. 9 and 10 show a construction of a conventional light beam heating apparatus and soldering of an article by the conventional light beam heating apparatus. The conventional light beam heating apparatus includes a light emitting lamp 1 (for example, a xenon lamp) for emitting light 3, an elliptical reflector 2 and an optical fiber 4. The optical fiber 4 has a light receiving end 4a for receiving light converged by the elliptical reflector 2 and an output end 4b such that the light incident upon the light receiving end 4a is outputted as light 5 from the output end 4b. The conventional light beam heating apparatus further includes a lens mechanism 6 which reconverges the light 5 outputted from the output end 4b of the optical fiber 4 into light 7. In order to cause the light 7 to have a focal diameter 8 required for an article 9 to be heated, the lens mechanism 6 has an adjustment stroke 10 relative to the output end 4b of the optical fiber 4.

In this conventional light beam heating apparatus, the light 3 emitted from the light emitting lamp 1 is converged by the elliptical reflector 2. The light receiving (input) end 4a of the optical fiber 4 is provided at the point of convergence such that the light is incident upon the light receiving end 4a. In order to cause the light 7 to have the focal diameter 8 required for the article 9, the lens mechanism 6 and the output end 4b of the optical fiber 4 are fixed at the adjustment stroke 10 such that the light 5 outputted from the output end 4b of the optical fiber 4 is reconverged into the light 7 by using the lens mechanism 6. A focal point of this reconverged light 7 is made coincident with the article 9 such that the article 9 is heated by the light 7.

However, in the conventional light beam heating apparatus referred to above, it is difficult to arbitrarily change the focal diameter 8 of the light 7 having passed through the lens mechanism 6. Therefore, in case a plurality of articles having different diameters are to be heated, a plurality of light beam heating apparatuses should be provided for different focal diameters thereby resulting in a huge investment. Alternatively, if a single light beam heating apparatus is adjusted to a minimum focal diameter for one of the articles and the remaining articles are also heated by the light beam heating apparatus, the remaining articles are heated at the improper focal diameter. Therefore, tact time is increased, thus resulting in inefficient heating.

SUMMARY OF THE INVENTION

Accordingly, an essential object of the present invention is to provide, with a view to eliminating the above mentioned disadvantages of prior art, a light beam heating apparatus in which a focal diameter can be arbitrarily changed to optimum values for articles having different diameters so as to maximize efficiency in heating the articles.

In order to accomplish this object of the present invention, a light beam heating apparatus according to the present invention comprises: a light source; an optical fiber for transmitting light from the light source; a lens mechanism (including a lens and a receiving end) which is provided at an output end of the optical fiber; and a first adjustment mechanism for adjusting the distance between the lens mechanism receiving end and the output end of the optical fiber.

In accordance with the present invention, the distance (adjustment stroke) between the lens mechanism and the output end of the optical fiber can be easily adjusted by the first adjustment component. Therefore, the focal diameter can be at all times arbitrarily changed, at low cost, to optimum values for the articles having different diameters. Consequently, the articles can be heated at quite high efficiency.

BRIEF DESCRIPTION OF THE DRAWINGS

This object and features of the present invention will become apparent from the following description taken in conjunction with the preferred embodiments thereof with reference to the accompanying drawings, in which:

FIG. 5 is a schematic view showing a construction of a light beam heating apparatus according to a third embodiment of the present invention;

FIGS. 6A and 6B are fragmentary sectional views of the light beam heating apparatus of FIG. 5, respectively;

Before the description of the present invention proceeds, it is to be noted that like parts are designated by like reference numerals throughout several views of the accompanying drawings.

DETAILED DESCRIPTION OF THE INVENTION

Hereinafter, embodiments of the present invention are described with reference to FIGS. 1 to 8B.

Figure 1:
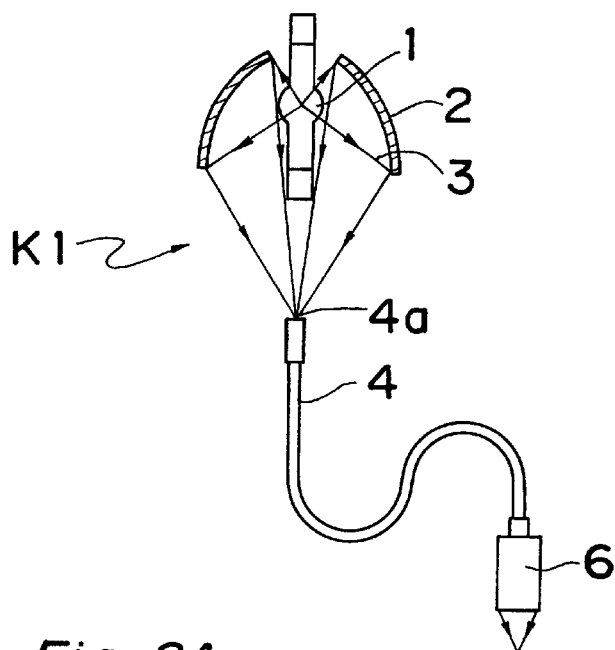
FIG. 1 is a schematic view showing a construction of a light beam heating apparatus according to a first embodiment of the present invention.
Figure 2A:
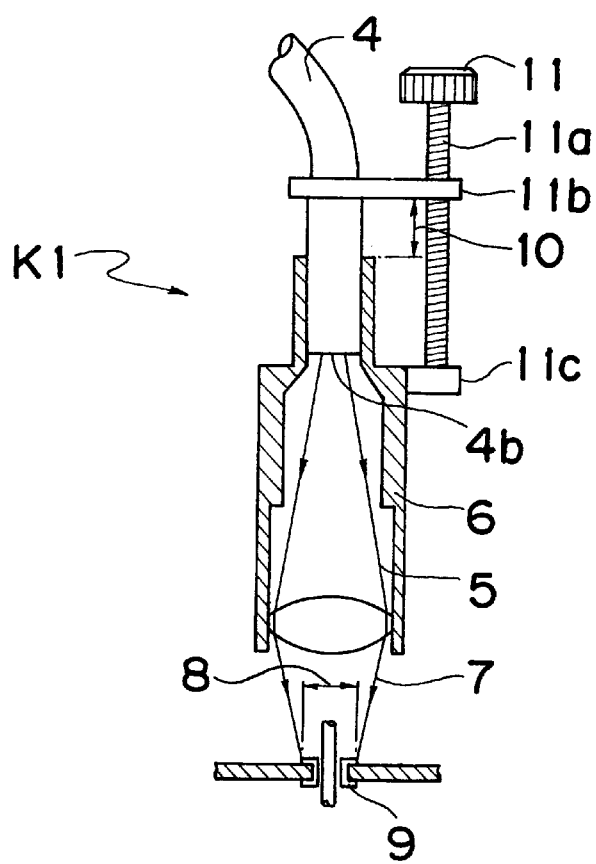
FIGS. 2A and 2B are fragmentary sectional views of the light beam heating apparatus of FIG. 1, respectively.
Figure 2B:
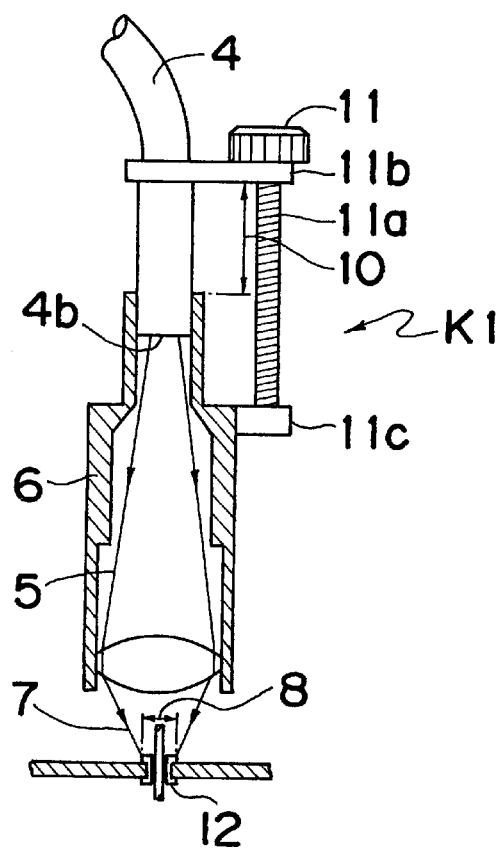
Figure 9:
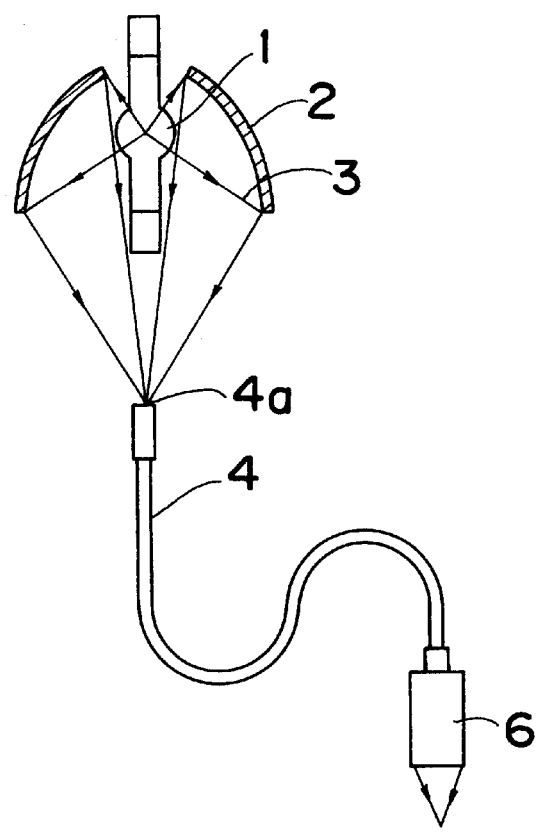
FIG. 9 is a schematic view of a prior art light beam heating apparatus.
Figure 10:
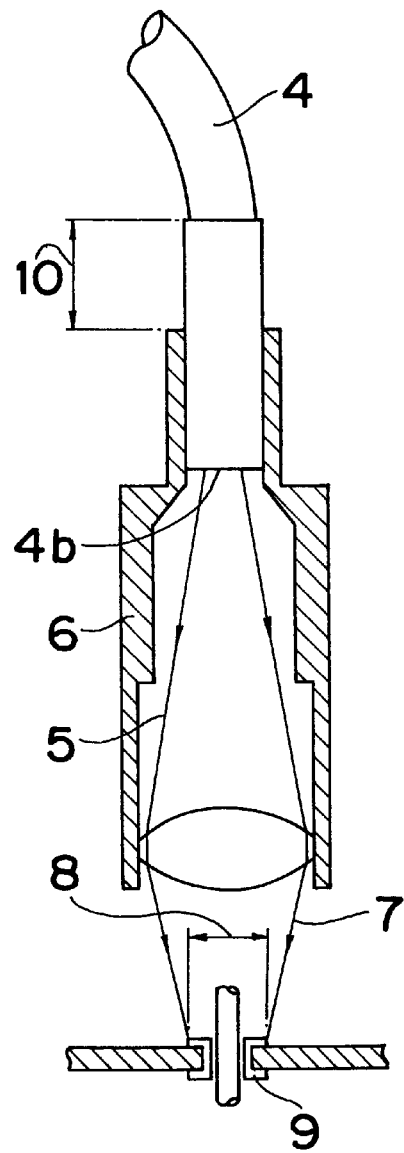
FIG. 10 is a fragmentary sectional view of the prior art light beam heating apparatus of FIG. 9.

Initially, FIG. 1 shows a light beam heating apparatus K1 according to a first embodiment of the present invention. In FIGS. 2A and 2B, articles 9 and 12 having different diameters are heated by the light beam heating apparatus K1, respectively. In the same manner as a prior art light beam heating apparatus mentioned earlier with reference to FIGS. 9 and 10, the light beam heating apparatus K1 includes a light emitting lamp 1 (for example, a xenon lamp) for emitting light 3, an elliptical reflector 2 and an optical fiber 4. The optical fiber 4 has a light receiving end 4a for receiving light converged by the elliptical reflector 2 and an output end 4b such that the light incident upon the light receiving end 4a is outputted as light 5 from the output end 4b. The light beam heating apparatus K1 further includes a lens mechanism 6 (including a lens 21 and a receiving end 6a) which reconverges, the light 5 outputted from the output end 4b of the optical fiber 4 into light 7 having a focal diameter 8. In this light beam heating apparatus K1, the light 3 emitted from the light emitting lamp 1 is converged by the elliptical reflector 2. The light receiving end 4a of the optical fiber 4 is provided at this point of convergence such that the light is incident upon the light receiving end 4a.

In contrast with the above mentioned prior art light beam heating apparatus, the light beam heating apparatus Ki further includes a first adjustment means 11 for easily adjusting an adjustment stroke 10 relating to the distance between the receiving end of the lens mechanism 6a and the output end 4b of the optical fiber 4. The first adjustment means 11 is comprised of a screw 11a, a holder 11b for holding the screw 11a and a contact portion 11c which is held in contact with or secured to a distal end of the screw 11a. The holder 11b is provided at a fixed portion of the optical fiber 4, while the contact portion 11c is provided on the lens mechanism 6.

The light beam heating apparatus K1 of the above described arrangement is operated as follows. The light 3 emitted from the light emitting lamp 1 is converged by the elliptical reflector 2. The light receiving end 4a of the optical fiber 4 is provided at the point of convergence such that the light is incident upon the light receiving end 4a. Then, in order to set the focal diameter 8 to values necessary for the articles 9 and 12, respectively, the adjustment stroke 10 relating to the distance between the lens mechanism receiving end 6a and the output end 4b of the optical fiber 4 is adjusted. This adjustment is made by turning the screw 11a of the first adjustment means 11 such that a distance between the lens mechanism receiving end 6a and the output end 4b of the optical fiber 4 is increased or decreased. Subsequently, the light 5 outputted from the output end 4b of the optical fiber 4 is reconverged into the light 7 by using the lens mechanism 6. The focal point of the light 7 is made coincident with the articles 9 and 12, respectively, such that the articles 9 and 12 are heated by the light 7.

In the light beam heating apparatus K1, the focal diameter 8 of the light 7 having passed through the lens mechanism 6 can be at all times arbitrarily changed at low cost by the first adjustment means 11 to optimum values for articles having different diameters. Consequently, the articles can be heated at quite high efficiency.

Figure 3:
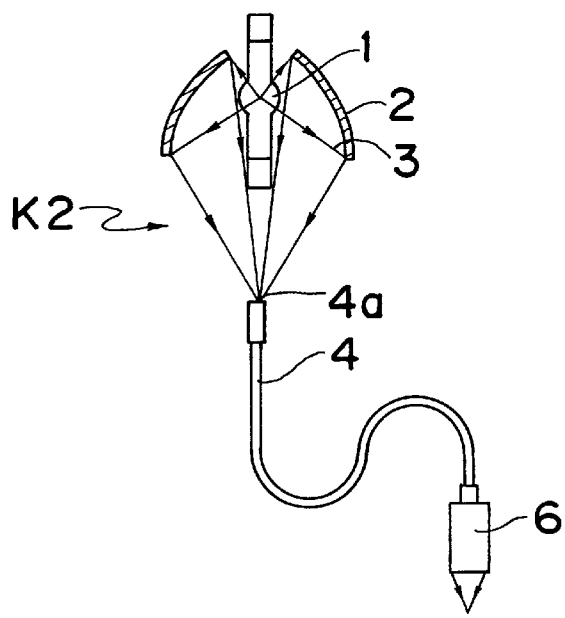
FIG. 3 is a schematic view showing a construction of a light beam heating apparatus according to a second embodiment of the present invention.
Figure 4A:
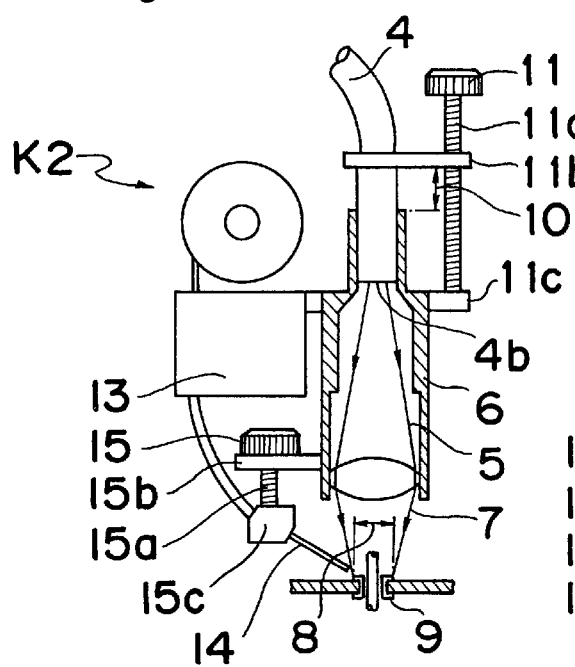
FIGS. 4A and 4B are fragmentary sectional views of the light beam heating apparatus of FIG. 3, respectively.
Figure 4B:
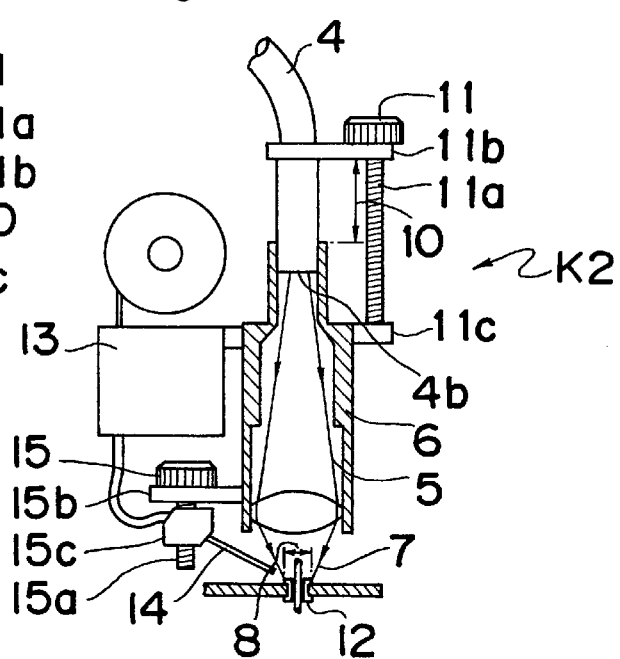

FIG. 3 shows a light beam heating apparatus K2 according to a second embodiment of the present invention. In FIGS. 4A and 4B, the articles 9 and 12 having different diameters are heated by the light beam heating apparatus K2, respectively. In the same manner as the light beam heating apparatus K1, the light beam heating apparatus K2 includes the first adjustment means 11. The light beam heating apparatus K2 further includes a soldering wire feeder 13 for feeding a threadlike soldering wire having a diameter of, for example, not more than 1 mm, a nozzle 14 for delivering the threadlike soldering wire, and a second adjustment means 15 for easily adjusting the height of the nozzle 14 to a target value in response to a change in focal length of the light 7. The second adjustment means 15 is comprised of a screw 15a, a holder 15b for holding the screw 15a and a movable portion 15c which is in threaded engagement with the screw 15a. The holder 15b is provided on the lens mechanism 6, while the nozzle 14 is attached to the movable portion 15c. Since other constructions of the light beam heating apparatus K2 are similar to those of the light beam heating apparatus K1, the description is abbreviated for the sake of brevity.

The light beam heating apparatus K2 of the above described arrangement is operated as follows. The light 3 from the light emitting lamp 1 is converged by the elliptical reflector 2 and the light receiving end 4a of the optical fiber 4 is provided at the point of convergence such that the light is incident upon the light receiving end 4a. Then, in order to set the focal diameter 8 to values necessary for the articles 9 and 12, respectively, the adjustment stroke 10 relating to the distance between the lens mechanism receiving end 6a and the output end 4b of the optical fiber 4 is adjusted. This adjustment is made by turning the screw 11a of the first adjustment means 11 such that the distance between the lens mechanism receiving end 6a and the output end 4b of the optical fiber 4 is adjusted. Thus, the light 5 outputted from the output end 4b of the optical fiber 4 is reconverged into the light 7 by using the lens mechanism 6. Consequently, the focal points of the light 7 are made coincident in position with the articles 9 and 12, respectively, such that the articles 9 and 12 are heated by the light 7. Meanwhile, the target height of the nozzle 14 is adjusted in accordance with the focal lengths of the light 7 by turning the screw 15a of the second adjustment means 15. The threadlike soldering wire is fed to the articles 9 and 12 by the soldering wire feeder 13 through the nozzle 14 such that the articles 9 and 12 are soldered. Therefore, the articles 9 and 12 can be heated and soldered by the light beam heating apparatus K2.

In the light beam heating apparatus K2, the focal diameter 8 of the light 7 having passed through the lens mechanism 6 can be at all times arbitrarily changed at low cost by the first adjustment means 11 to optimum values for articles having different diameters. In addition, the target height of the nozzle 14 can be at all times changed at low cost to optimum values in response to a change in focal length of the light 7 by the second adjustment means 15. Consequently, the articles can be heated and soldered at quite high efficiency.

FIG. 5 shows a light beam heating apparatus K3 according to a third embodiment of the present invention. In FIGS. 6A and 6B, the articles 9 and 12 having different diameters are heated by the light beam heating apparatus K3, respectively. In the same manner as the light beam heating apparatus K2, the light beam heating apparatus K3 includes the soldering wire feeder 13 and the nozzle 14. In the light beam heating apparatus K3, the first adjustment means 11 and the second adjustment means 15 of the light beam heating apparatus K2 are, respectively, replaced by a third adjustment means 16 for automatically adjusting the adjustment stroke 10 relating to the distance between the lens mechanism receiving end 6a and the output end 4b of the optical fiber 4, and a fourth adjustment means 17 for automatically adjusting the target height of the nozzle 14 in response to change of focal length of the light 7 caused by an arbitrary a change in the focal diameter 8 of the light 7. The third adjustment means 16 is comprised of a motor 16a, a holder 16b for holding the motor 16a, a screw 16c driven by the motor 16a and a further holder 16d which is in threaded engagement with the screw 16c. The holder 16b is provided on the lens mechanism 6, while the further holder 16d is provided at a fixed portion of the optical fiber 4. The fourth adjustment means 17 is comprised of a motor 17a, a holder 17b for holding the motor 17a, a screw 17c driven by the motor 17a and a movable portion 17d which is in threaded engagement with the screw 17c. The holder 17b is provided on the lens mechanism 6, while the nozzle 14 is provided on the movable portion 17d. In addition, a control unit 18 for controlling the third and fourth adjustment means 16 and 17 is provided. Since other constructions of the light beam heating apparatus K3 are similar to those of the light beam heating apparatus K2, the description is abbreviated for the sake of brevity.

The light beam heating apparatus K3 of the above described arrangement is operated as follows. The light 3 from the light emitting lamp 3 is converged by the elliptical reflector 2. The light receiving end 4a of the optical fiber 4 is provided at the point of convergence such that the light is incident upon the light receiving end 4a. Then, in order to set the focal diameter 8 to values necessary for the articles 9 and 12, respectively, the adjustment stroke 10 relating to the distance between the lens mechanism receiving end 6a and the output end 4b of the optical fiber 4 is calculated by the control unit 18, and the lens mechanism 6 and the output end 4b of the optical fiber 4 are set to the calculated adjustment stroke 10 automatically by using the third adjustment means 16. Thus, the light 5 outputted from the output end 4b of the optical fiber 4 is reconverged into the light 7 by using the lens mechanism 6. The focal point of the light 7 is made coincident with the articles 9 and 12, respectively, such that the articles 9 and 12 are heated by the light 7. At the same time, the target height of the nozzle 14 is calculated by the control unit 18 in response to a change of focal length of the light 7. The nozzle 14 is then automatically adjusted to the calculated target height by the fourth adjustment means 17. Thus, the threadlike soldering wire is fed to the articles 9 and 12 by the soldering wire feeder 13 through the nozzle 14 such that the articles 9 and 12 are soldered. Consequently, the articles 9 and 12 can be heated and soldered by the light beam heating apparatus K3.

In the light beam heating apparatus K3, the automatic adjustment means 16 and 17 and the control unit 18 for controlling the automatic adjustment means 16 and 17 are provided. Therefore, the focal diameter 8 of the light 7 can be at all times automatically changed arbitrarily at low cost to optimum values for articles having different diameters. Furthermore, the target height of the nozzle 14 can be at all times changed to optimum values in response to a change in the focal length of the light 7 at low cost. Consequently the articles can be heated and soldered more efficiently than the light beam heating apparatuses K1 and K2.

In the light beam heating apparatus K3, the first and second adjustment means 11 and 15 of the light beam heating apparatus K2 are, respectively, replaced by the third and fourth adjustment means 16 and 17. In addition, the control unit 18 for controlling the third and fourth adjustment means 16 and 17 is further provided. The light beam heating apparatuses K1 and K3 may be modified variously. For example, it is possible to employ an arrangement in which the first adjustment means 11 is replaced by the third adjustment means 16 and the control unit 18 in the light beam heating apparatus K1. A further arrangement can be employed in which the fourth adjustment means 17 is replaced by the second adjustment means 15 in the light beam heating apparatus K3. Still further, an arrangement in which the third adjustment means 16 is replaced by the first adjustment means 11 in the light beam heating apparatus K3 may also be employed.

Figure 7:
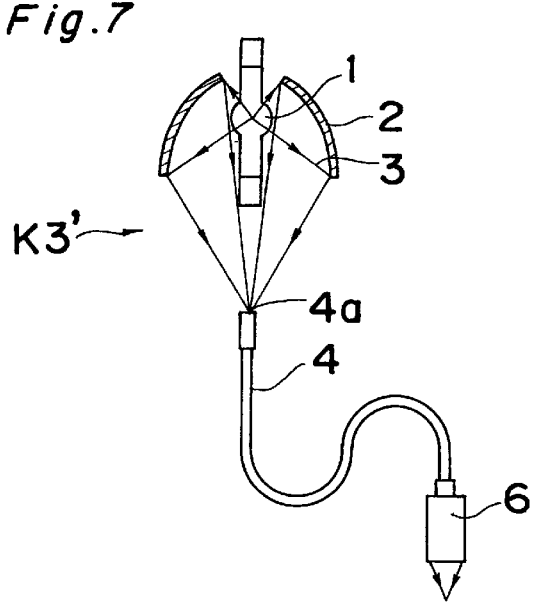
FIG. 7 is a schematic view showing a construction of a light beam heating apparatus which is a modification of the light beam heating apparatus of FIG. 5.
Figures 8A, 8B:
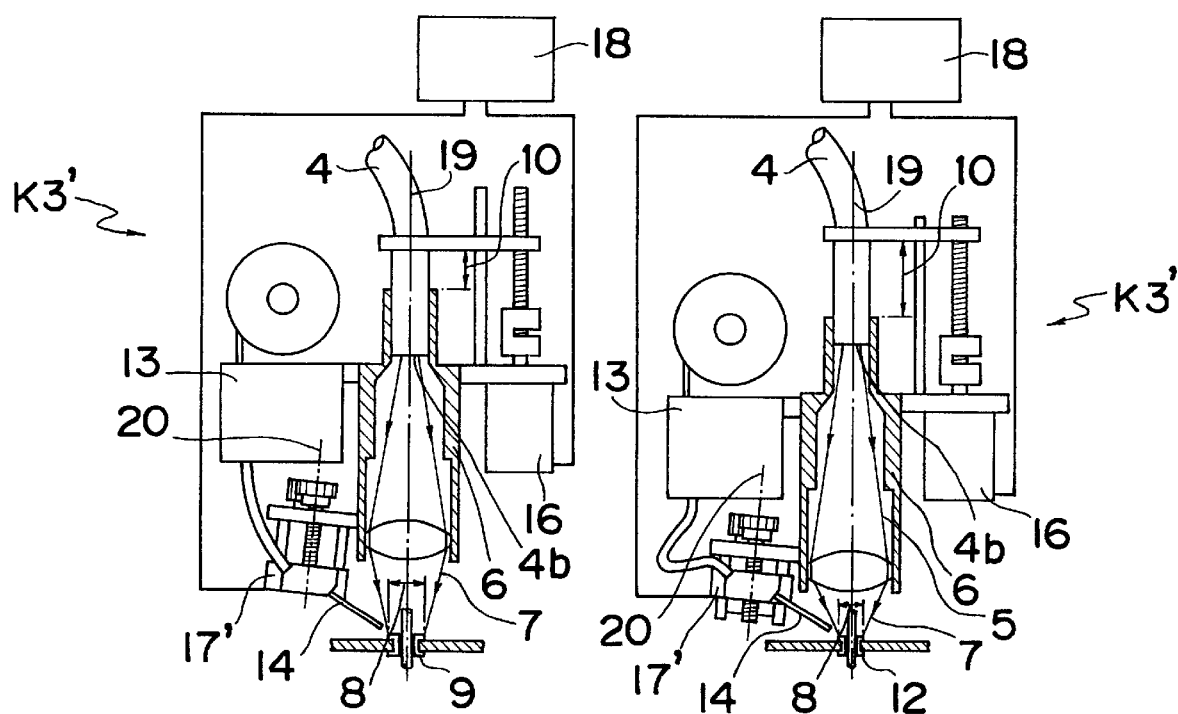
FIGS. 8A and 8B are fragmentary sectional views of the light beam heating apparatus of FIG. 7, respectively.

FIG. 7 shows a light beam heating apparatus K3' which is a modification of the light beam heating apparatus K3. In FIGS. 8A and 8B, the articles 9 and 12 having different diameters are heated by the light beam heating apparatus K3', respectively. In the light beam heating apparatus K3', the fourth adjustment means 17 of the light beam heating apparatus K3 is replaced by a fourth adjustment means 17'. In the light beam heating apparatus K3', the lens mechanism 6 has an optical axis 19, and the fourth adjustment means 17' for adjusting the target height of the nozzle 14 has an axis 20 inclined at an angle of several degrees relative to the optical axis 19 of the lens mechanism 6. Since other constructions of the light beam heating apparatus K3' are similar to those of the light beam heating apparatus K3, the description is abbreviated for the sake of brevity.

The light beam heating apparatus K3' of the above described arrangement is operated as follows. The light 3 from the light emitting lamp 3 is converged by the elliptical reflector 2. The light receiving end 4a of the optical fiber 4 is provided at the point of convergence such that the light is incident upon the light receiving end 4a. Then, in order to set the focal diameter 8 to values necessary for the articles 9 and 12, respectively, the adjustment stroke 10 relating to the distance between the lens mechanism receiving end 6a and the output end 4b of the optical fiber 4 is calculated by the control unit 18. Then, the lens mechanism 6 and the output end 4b of the optical fiber 4 are set to the calculated adjustment strokes 10 automatically by using the third adjustment means 16. Thus, the light 5 outputted from the output end 4b of the optical fiber 4 is reconverged into the light 7 by using the lens mechanism 6. The focal point of the light 7 is made coincident with the articles 9 and 12, respectively, such that the articles 9 and 12 are heated by the light 7. At the sane time, the target height of the nozzle 14 is calculated in response to the change in focal length of the light 7 by the control unit 18, and the nozzle 14 is automatically adjusted to the calculated target height by the fourth adjustment means 17'. Thus, the threadlike soldering wire is fed to the articles 9 and 12 by the soldering wire feeder 13 through the nozzle 14 such that the articles 9 and 12 are soldered. Consequently, the articles 9 and 12 can be heated and soldered by the light beam heating apparatus K3'.

In the light beam heating apparatus K3', the axis 20 of the fourth adjustment means 17' for adjusting the target height of the nozzle 14 is inclined at an angle of several degrees relative to the optical axis 19 of the lens mechanism 6. Consequently, a distal end of the nozzle 14 can be at all times spaced a fixed distance from the focal diameter contour corresponding to the focal length of the light which heats articles having different diameters. Therefore, in the light beam heating apparatus K3', the phenomenon that the distance between the distal end of the nozzle 14 and the focal diameter contour changes upon a change in the focal diameter 8 at the time of soldering is eliminated. Hence, melt down or jamming of the threadlike soldering wire can be prevented, and soldering is performed more stably than in the light beam heating apparatuses K2 and K3. Thus, the articles can be heated and soldered at remarkably high efficiency.

In the light beam heating apparatus K3', the axis 20 of the fourth adjustment means 17' is inclined relative to the optical axis 19 of the lens mechanism 6. This angular setting may also be employed in the light beam heating apparatus K2.

In the above embodiments, the light emitting lamp and the elliptical reflector are employed as a light source but may be variously replaced by, for example, a laser diode, a $CO_2$ laser, etc.

As is clear from the foregoing description, the light beam heating apparatus according to the first embodiment of the present invention comprises the light source, the optical fiber for transmitting light from the light source, the lens mechanism which is provided at the output end of the optical fiber and the first adjustment means for adjusting the distance between the lens mechanism receiving end and the output end of the optical fiber. In this light beam heating apparatus, since the focal diameter can be at all times arbitrarily changed at low cost to optimum values for articles having different diameters, the articles can be heated at quite high efficiency.

The light beam heating apparatus according to the second embodiment of the present invention further comprises the soldering wire feeder for feeding the threadlike soldering wire, the nozzle and the second adjustment means for adjusting the height of the nozzle in response to a change in the focal length of the light having passed through the lens mechanism. Therefore, the focal diameter can be at all times arbitrarily changed at low cost to optimum values for articles having different diameters. Furthermore, the target height of the nozzle can be at all times set at low cost to optimum value for the article in response to a change in the focal length so that the articles can be heated and soldered at quite high efficiency.

Meanwhile, the light beam heating apparatus according to the third embodiment of the present invention further comprises the first drive means for driving the first adjustment means, the second drive means for driving the second adjustment means, and the control unit for controlling the drive of the first adjustment means made by the first drive means and the drive of the second adjustment means made by the second drive means. Therefore, not only the focal diameter can be at all times arbitrarily changed automatically at low cost to optimum values for the articles having different diameters, but the target height of the nozzle can also be at all times set automatically at low cost to optimum value for the article in response to a change in the focal length. Consequently, heating and soldering can be performed more efficiently than the light beam heating apparatuses according to the first and second embodiments of the present invention.

In addition, the axis of the second adjustment means may also be inclined relative to the optical axis of the lens mechanism in the light beam heating apparatus which is the modification of the light beam heating apparatus according to the third embodiment of the present invention. If the second adjustment is inclined, then not only can the focal diameter be at all times arbitrarily changed automatically at low cost to optimum values for the articles having different diameters, but the target height of the nozzle can also be at all times set automatically at low cost to an optimum value for the article in response to a change in the focal length without any change in distance between the distal end of the nozzle and the articles having different diameters upon change of the focal diameter. Therefore, since melt down or jamming of the threadlike soldering wire can be prevented, soldering is performed more stably than the light beam heating apparatuses according to the second and third embodiments of the present invention. Consequently, heating and soldering can be performed at remarkably high efficiency.

What is claimed is:

1. A light beam heating apparatus comprising:

a light source;

an optical fiber having an output end;

a lens mechanism at said output end of said optical fiber, said lens mechanism having an optical axis, wherein light from said light source is transmitted through said lens mechanism via said optical fiber;

a first adjustment mechanism for adjusting a distance between said lens mechanism and said output end portion of said optical fiber so as to create a change in focal length of the light transmitted through said lens mechanism;

a first drive mechanism for driving said first adjustment mechanism;

a nozzle for delivering soldering wire, said nozzle having a distal end;

a soldering wire feeder for feeding the soldering wire through said nozzle;

a second adjustment mechanism for adjusting a height of said nozzle in response to the change in focal length of the light transmitted through said lens mechanism, wherein said second adjustment mechanism has an axis inclined with respect to said optical axis of said lens mechanism such that a distance between said distal end of said nozzle and a focal diameter contour of the light transmitted through said lens mechanism remains constant;

a second drive mechanism for driving said second adjustment mechanism; and a control unit for controlling an operation of said first drive mechanism, and for automatically controlling an operation of said second drive mechanism in response to the change in focal length of the light transmitted through said lens mechanism.

* * * * *